Figure 1:
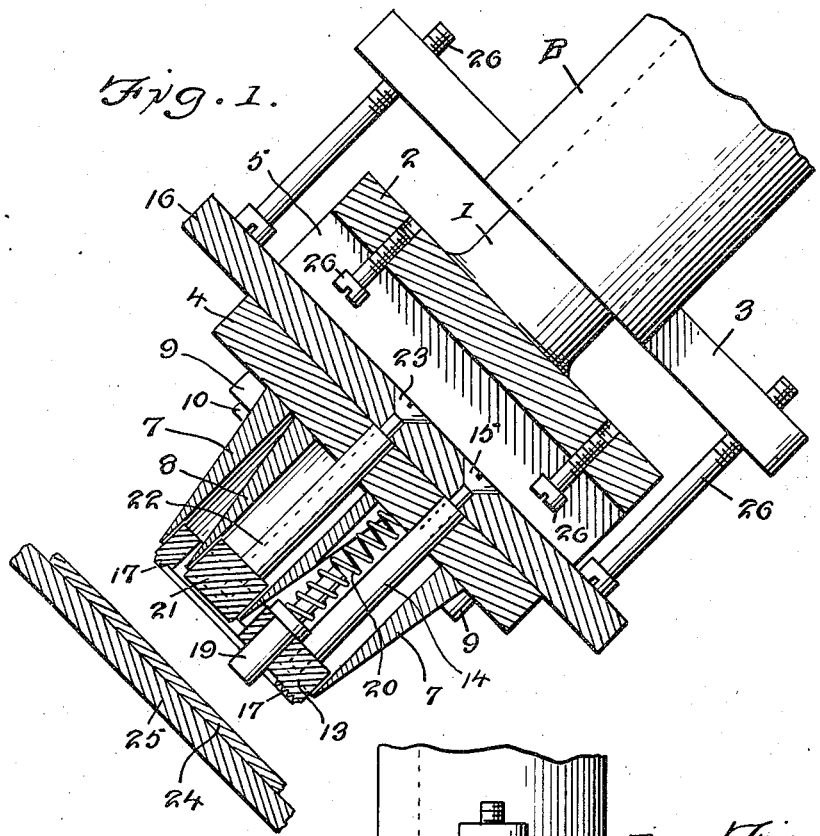

July 18, 1939.  J. A. PARSONS  2,166,550

MAKING SHAPED CASEIN PLASTICS

Filed Nov. 26, 1937  3 Sheets-Sheet 1

Inventor
John A. Parsons

By Foster & Codier
Attorneys

July 18, 1939.   J. A. PARSONS   2,166,550
MAKING SHAPED CASEIN PLASTICS
Filed Nov. 26, 1937   3 Sheets-Sheet 2

Inventor
John A. Parsons
Foster Codier
Attorneys

July 18, 1939.   J. A. PARSONS   2,166,550
MAKING SHAPED CASEIN PLASTICS
Filed Nov. 26, 1937   3 Sheets-Sheet 3

Inventor
John A. Parsons
By Foster & Codier
Attorneys

Patented July 18, 1939

2,166,550

UNITED STATES PATENT OFFICE 2,166,550

MAKING SHAPED CASEIN PLASTICS

John A. Parsons, Bainbridge, N. Y., assignor to American Plastics Corporation, New York, N. Y., a corporation of New York Application November 26, 1937, Serial No. 176,731

8 Claims. (Cl. 18—48)

This invention relates to a method of forming uncured plastic casein.

The cutting-out of various shapes, such as button blanks, buckles, etc., from either cold uncured plastic casein sheets or strips and then curing the pieces in formaldehyde baths or with some other hardening agent, has long been known to those skilled in the art. The greatest advantage of this method, over that of cutting from cured sheets or strips, is that the resulting waste from uncured casein plastic can be reworked, whereas the waste from cured material cannot be, in any practical way known at present. After curing the cut-out pieces, it has been often desirable to make a design on the surface, for ornamental purposes, or to form the pieces by changing the shape considerably. This has been accomplished in the past either by carving the pieces or by heating them, either by soaking in water at from 100° F. to boiling point or by dry heat, and then placing them in a cold mold and applying pressure. The carving method is limited as to the designs that can be carved on different thicknesses of material. Carving operations are also expensive. The molding from cured casein plastic method is not ideal, in that if the articles subsequently become heated, especially in the presence of moisture (e. g. in ordinary laundering processes), they tend to go back to the original shape which they had before molding. The art of molding articles from uncured casein has been well known to those skilled in this art. It has been thought, however, that the material must be heated and then cooled. I have now discovered, and this constitutes the basis of the present application, that cold uncured casein plastic sheets or strips can be cut into shapes, at the same time stamping a design on the pieces, or forming (shaping) the pieces, or both. The material during such process can be at about room temperature, say from 60° F. to 85° F. It will be appreciated however, that the forming or shaping, which can be done, is somewhat limited in amount. It would not be possible to produce any considerable amount of flow, in the casein plastic mass, during such cold step.

The present invention has for its object the stamping and embossing from plasticized casein in the form of sheets (which term as used herein, also includes ribbons or narrow sheets). The plasticizing can be effected by extruding the casein, with about 20% to 33% of water (some of which may be replaced by other plasticizing agents such as glycerin or the like). The extruded material may be a ribbon, or may, if desired, be made into large sheets on a hydraulic press, or otherwise, and may, if desired, be cut to a convenient width.

The material is treated cold, that is to say, it does not have to be heated nor cooled during the process. In stating that this is cold, I mean that it can conveniently be at room temperature, such as 60–85° F. The parts of the machine with which the casein sheet comes into contact are also cold, or at room temperature.

I will describe two operations that are within the scope of the invention, first the manufacture of a buckle blank, and second the manufacture of a button, these of course being purely by way of illustration, since great numbers of different articles can be made by this process.

The annexed drawings show two forms of apparatus suitable for carrying out the process of the invention.

In said drawings:

Fig. 1 shows a vertical section of a die and associated parts, the die being in its raised position ready for being operated.

Figure 2:
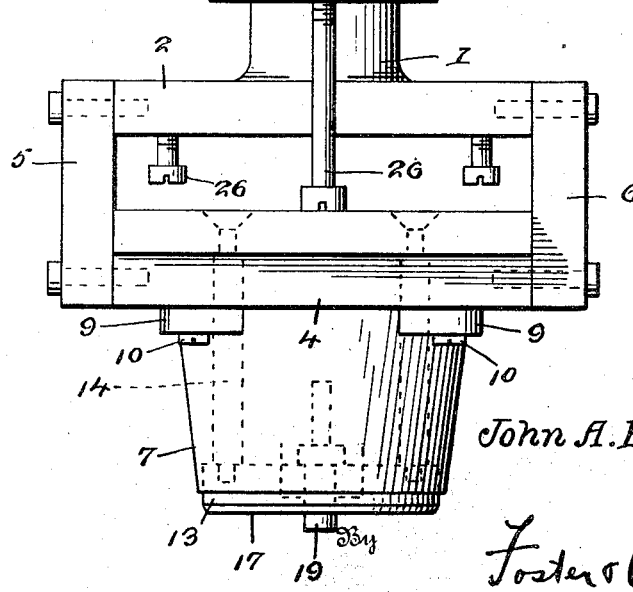
Figure 3:
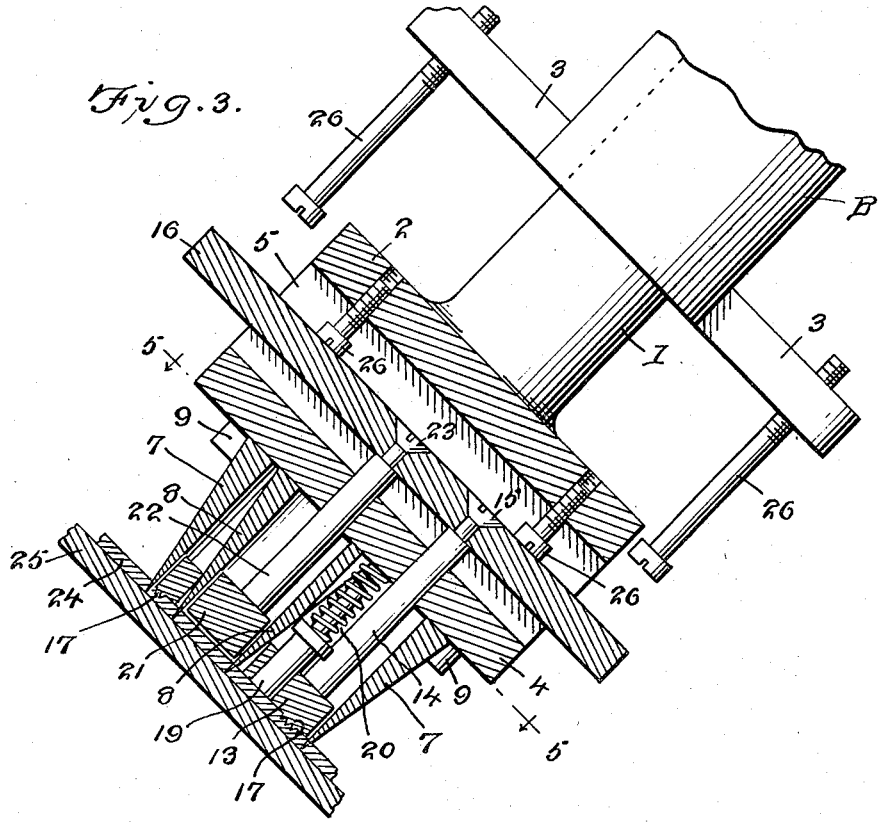
Figure 4:
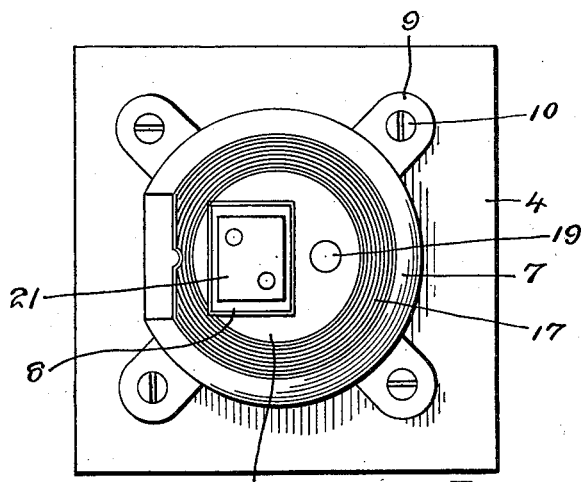
Figure 5:
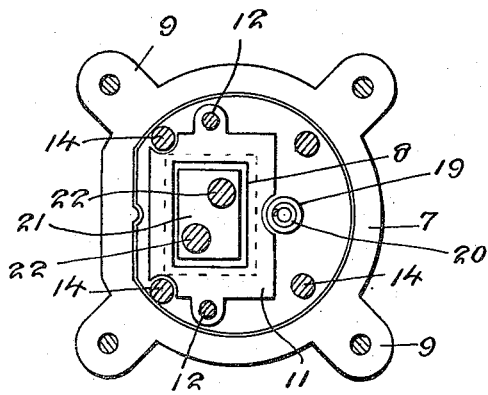
Figure 6:
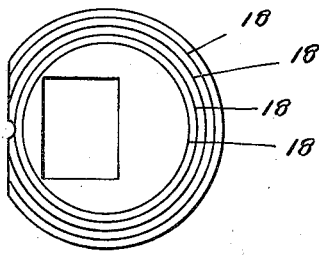
Figure 7:
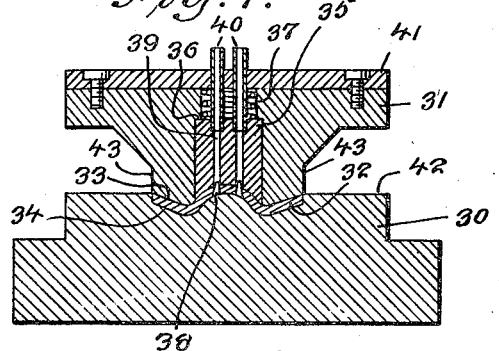
Figure 9:
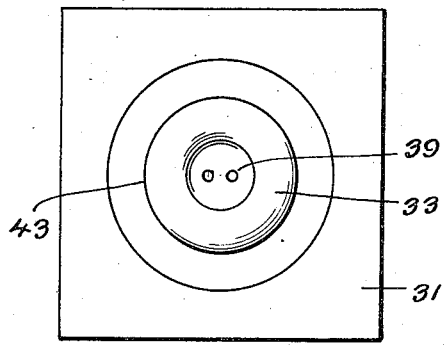
Figure 8:
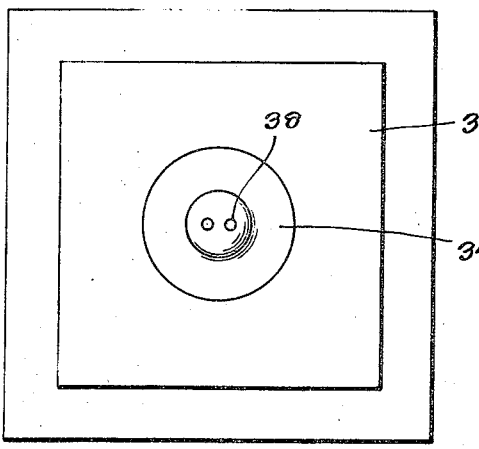

Fig. 2 shows a front elevation of the die in the same position, the plate and plastic material being omitted, Fig. 3 shows a vertical section of the same device, at the end of the downward stroke of the die, Fig. 4 is a bottom plan view of the die, Fig. 5 is a top plan section on line 5—5 of Fig. 3, Fig. 6 is a top plan view of the completed article made in the apparatus of Figs. 1 to 5 inclusive, Fig. 7 is a vertical section of a die press for making buttons, shown in the closed position, Fig. 8 is a plan view of the lower half of this apparatus of Fig. 7, and Fig. 9 is a bottom plan view of the top half of the same apparatus.

Referring to the device shown in Figs. 1 to 5 inclusive, for making the belt buckle shown in Fig. 6. This apparatus and the punch press operating same, are preferably placed at an angle, as shown for more easily discharging the articles produced.

1 is the plunger of an ordinary punch press, which is attached to the cross piece 2, supporting the body of the die. This slides in a groove in the bearing frame B, which carries the stationary cross arm 3. 2 is rigidly connected to a plate 4, by two end plates 5 and 6. Attached to 4 are the outer cutter 7 and the inner cutter 8. The shapes of these two cutters are shown clearly in Fig. 5. The cutter 7 is attached to 4 by lugs 9 and screws 10. As shown in Fig. 5, the cutter 8 is supported by plate 11 having screws 12, being screwed into plate 4.

Situated normally somewhat below the lower end of the cutters 7 and 8, is the embossing plate 13, supported by several rods 14 (one being shown in Fig. 1 and four being shown in Fig. 5), by screws 15 to the plate 16. The plate 13 may have any suitable embossing device, such as the circular sharp ring-shaped projections 17, shown. The function of these is to emboss the rings shown at 18, in Fig. 6, into the top of the article being made.

19 is a knock-out, projecting through a hole in plate 13, and carrying a spring 20, which presses the knock-out downwardly, to cause the formed article to fall off from the plate 13, and especially from the projections 17. The upper end of the spring presses against the plate 4.

21 is a knock-out for the rectangular piece which will be cut out by the inner cutter 8. This is supported by one or more rods 22, attached to the plate 16 by screws 23.

24 is a sheet of plasticized uncured cold casein mass, supported on a cold soft metal plate 25, which may be brass.

In operation, the plates 2 and 4 are forced downwardly, the embossing plate 13 first striking the casein sheet, and the embossing devices 17 entering the plastic mass. Then this embossing plate is stopped. Then the cutters 7 and 8 continue to descend until their lower edges contact the plate 25, thereby cutting off the casein mass and the cutout piece. At this time the plates 2 and 4 will have descended until the heads of the screws 26 have struck the plate 16. These screws 26 are adjusted up and down to accommodate thicker or thinner sheets of the casein plastic mass 24. At just before the end of the down stroke of 2 and 4, the heads of the screws 26 strike the plate 16 to drive down the embossing plate 13 and to drive the embossing devices 17 the whole distance into the plasticized casein mass, while the plane portion of plate 13 thoroughly smooths the top of the casein mass, by pressure between 13 and 25. This stage of the process is shown in Fig. 3.

Then the die is raised. When starting to raise the die, the plunger 1 starts upwardly, raising the plates 2 and 4, and the cutters 7 and 8, the cutters and the stamped out article carrying the plate 13 and knock-out 21 upwardly, until the ends of plate 16 strike the heads of screws 26 which are carried by the stationary brace 3.

Then the plate 16 and everything carried thereby becomes stationary.

The cutters 7 and 8, being attached to the plate 4, continue their upward movement, thereby releasing the article from the cutters 7 and 8, but the article will still adhere to the embossing plate 13 and particularly to the embossing rings 17. Then the knock-out 19 is forced downwardly by spring 20, releasing the article and causing it to drop. But it does not drop back into the hole in the plastic sheet 24, because of the fact that the whole machine is not vertical but is set at an angle. It falls into a chute (not shown) behind the lower edge of the sheet 24, and the cutter 8 raising the rectangular cut-out against 21 knocks out said rectangular piece into the said chute.

In practice, the sheet 24 may be cut wide enough for cutting two rows of the articles, and the lower row may be cut out first, then the sheet turned over to make a separate series of articles from what will then be the lower edge of the sheet or strip. Or the strip may be wide enough for one row of the articles, or for several rows of the same, as desired.

Or if desired, discs of the sheeted casein plastic may be fed to the plate 25, in which case the machine could be upright instead of inclined.

The plate 25 may also carry embossing devices, similar to 17 or different therefrom, for embossing both top and bottom of the article.

In view of the fact that there is no heating or cooling to be accomplished during this process, the operation can be very rapid, say 40 to 80 cuts per minute.

Referring now to the apparatus shown in Figs. 7 to 9, 30 is a lower half of the die press and 31 is the upper coacting half of the same. 32 indicates the button being made in this press, by the lowering of the top section of the die, upon a sheet of plasticized casein plastic. It will be observed that the top surface of the die, 33 and the bottom surface 34, coacting therewith, are everywhere substantially equidistant from each other, since the present invention is inapplicable to the production of articles where much flow of the plasticized casein is necessary, but a small amount of flow is possible, so that the thickness at one portion of the area of the finished button may be as much as 25% or 30% greater than at some other portion thereof. But it is readily possible also to provide relatively sharp ridges (straight or curved, e. g. similar to the circular ridges 17 shown on the bottom of the die in Fig. 1), on either or both the surfaces 33 and/or 34, or pointed pin-like projections could be provided on 33 and/or 34.

In this device a "knock-out" is shown, provided by a cylindrical piece 35, supported against an upper shoulder 36, and urged downwardly by a coiled spring 37.

For making buttons, having thread holes therein, a plurality of pins (two shown) 38 are provided on the base 30, and passages 39 are bored in the cylindrical part 35, which are continued as tubes 40 above this and through the top plate 41. The small bits of the plastic forced out or punched out by the pins 38 will travel upwardly through the passages 39 and 40.

The device of Figs. 7, 8 and 9 is also preferably set up on an angle, similarly to that shown above.

In the operation of this device, sheets or ribbons may be fed to the die, along the upper surface 42 of the lower portion 30. The part 31 in descending, cuts off a disc of the material by the edge 43 contacting the opening in the top surface 42. The two opposing surfaces of the die approach each other to the position shown in Fig. 7, thereby forming the button.

On the up stroke, the spring 37 pushes the cylindrical part 35 downwardly for a short distance, knocking out the button, which due to the inclination of the machine drops into a suitable chute.

Obviously where a single die is shown, in the above devices, a gang of said dies can be provided.

In making suitable buttons in the device of Figs. 7 to 9, with as much shaping as is here indicated, a casein plastic should preferably be employed which contains 24-30% of water, or an equivalent amount of other plasticizing agent.

For the operation of the device of Figs. 7 to 9, a pressure of about 10,000 lbs. per square inch is preferred. In operating the device of Figs. 1 to 5, a pressure of 1000 lbs. per square inch is sufficient.

The stamped and engraved casein plastic articles made by this process will then be cured, as by the conventional soaking in formaldehyde solution, of a strength and for a length of time depending on the thickness, e. g. a 10% solution of formaldehyde for two days, for articles 2 mm. thick. Then they are dried, and are ready for polishing and other subsequent operations.

The casein plastic mass can, of course, contain any desired dyestuff, pigment, etc. to give the required color.

I claim:

1. A process which comprises stamping and somewhat forming pieces from a sheet of cold uncured plasticized casein mass between cold surfaces, said plasticized casein mass containing a liquid plasticizing agent, such steps being conducted without applying heat to the casein material and thereafter curing the said pieces.

2. A process which comprises stamping and somewhat forming pieces from a sheet of cold uncured plasticized casein mass between cold surfaces, said plasticized casein mass containing a liquid plasticizing agent equivalent to about 20% to about 33% of water, such steps being conducted without applying heat to the casein material and thereafter curing the said pieces.

3. A process which comprises punching out and embossing pieces from a sheet of cold uncured plasticized casein mass between cold surfaces, said plasticized casein mass containing a liquid plasticizing agent, such steps being conducted without applying heat to the casein material and thereafter curing the said pieces.

4. A process which comprises shaping and forming by a stamping operation, a button of substantially uniform thickness over its entire area, from a sheet of cold uncured plasticized casein mass, between cold surfaces having substantially parallel curvatures, said plasticized casein containing a liquid plasticizing agent in amount equivalent to about 25% to about 30% of water, and punching out thread holes in said button during said stamping operation, such steps being conducted without applying heat to the casein material and thereafter curing said button.

5. The method of stamping and embossing a casein plastic which comprises feeding a strip of cold, uncured plasticized casein into a cold press, stamping out a shape from said cold sheet, and embossing same by means of a cold die such steps being conducted without applying heat to the casein material.

6. The method of stamping and embossing a casein plastic which comprises feeding a strip of cold, uncured plasticized casein into a cold press, where it is operated on by a cold die to stamp out of the said strip a desired shape, and to simultaneously emboss a design on the surface of said shape, and discharging the produced article from the die without previously heating the said article during said method.

7. The method of forming desired shapes from plastic casein, which comprises stamping and embossing a desired shape from a strip of cold plasticized uncured casein by meass of a cold die in a cold press such steps being conducted without applying heat to the casein material.

8. A process of making formed casein plastic articles having a non-flat ornamental surface which comprises introducing a cold casein sheet-form plastic mass into a cold mold, molding the mass under high pressure, and removing the molded article from the mold, all of such operations being conducted at about ordinary atmospheric temperature.

JOHN A. PARSONS.